Oct. 6, 1953          C. R. DOTY          2,654,432
                   CARD PUNCHING MACHINE
Filed Dec. 27, 1950                    4 Sheets-Sheet 2
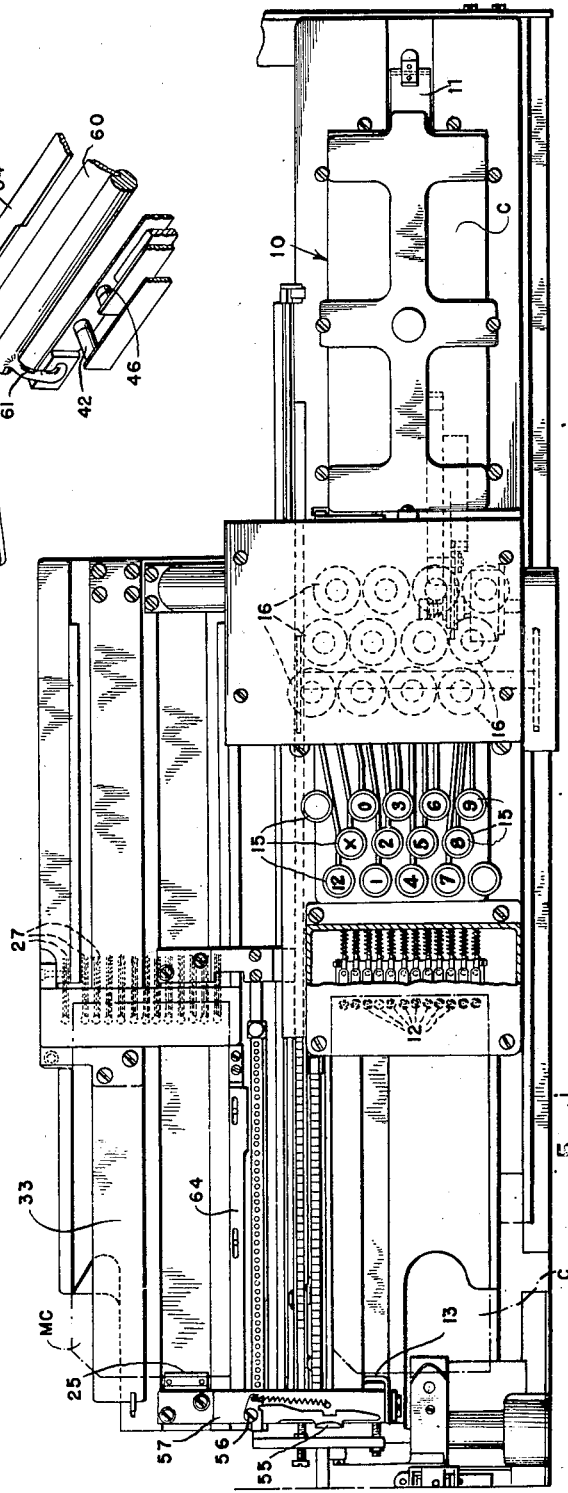
INVENTOR
CHARLES R. DOTY
BY Charles P. Boberg
ATTORNEY Oct. 6, 1953     C. R. DOTY     2,654,432
CARD PUNCHING MACHINE Filed Dec. 27, 1950     4 Sheets-Sheet 3

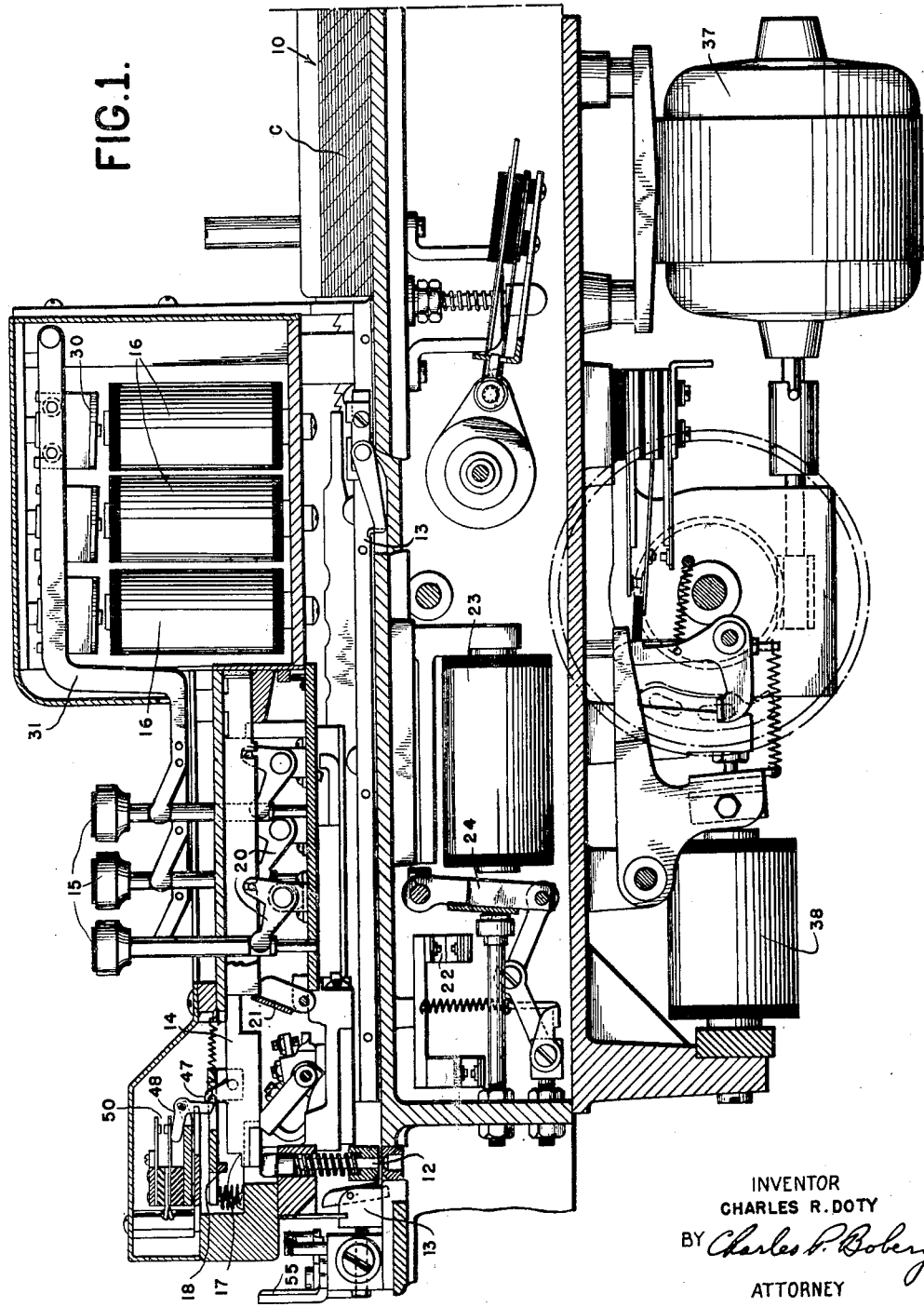

INVENTOR
CHARLES R. DOTY
BY Charles P. Boberg
ATTORNEY

Oct. 6, 1953 C. R. DOTY 2,654,432
CARD PUNCHING MACHINE
Filed Dec. 27, 1950 4 Sheets-Sheet 4

INVENTOR
CHARLES R. DOTY
BY Charles P. Boberg
ATTORNEY

Patented Oct. 6, 1953

2,654,432

UNITED STATES PATENT OFFICE 2,654,432

CARD PUNCHING MACHINE

Charles R. Doty, Poughkeepsie, N. Y., assignor to International Business Machines Corporation, New York, N. Y., a corporation of New York Application December 27, 1950, Serial No. 202,870

3 Claims. (Cl. 164—113)

This invention relates to card punching devices of the type which may be operated optionally as manual key punches or as card-controlled duplicating punches. Such card punching devices are known generally in the art as "duplicating punches."

In perforating a record card by means of a duplicating punch, it is common practice to perforate certain columns of the record card automatically under the control of a master card, thereby duplicating the information which is contained in the corresponding columns of the master card, and to perforate other columns of the record card manually by key punching. In some instances it is desired to check the information which is being key-punched in the record card against information which is contained in the master card, for the purpose of detecting or preventing errors which might otherwise occur in the key punching process. This latter type of operation, wherein the master card edits or supervises the manual punching of data in the record card, might be described as "edited" key punching.

Key punches controlled by master cards have been proposed heretofore, but they have been subject to several disadvantages. In the first place, these prior machines required the use of an individual magnet and locking device for each key in the keyboard. Furthermore, while they were adapted to utilize master cards to govern key punching, they could not be used as straight duplicating punches for automatically duplicating the information contained in the master cards.

An object of the present invention is to provide simple, inexpensive and novel means whereby a card punch of the duplicating type may be used optionally as an editing key punch.

Another object is to provide an improved card punch which can be used optionally for straight key punching, straight duplication, or for edited key punching.

The editing feature of the machine entails the provision of individual punch control circuits that extend respectively through the master card reading brushes and through corresponding contacts operated by the punch interposer elements, the arrangement being such that the punch unit will not operate unless there is correspondence between the selected punch interposers and the perforations in the master card.

The invention also features an improved column cutout means which can be operated selectively to suppress the editing function or the duplicating function of the machine, or both functions, depending upon the type of operation which the machine is required to perform.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a vertical sectional view of a card punching machine which embodies the invention.

Fig. 2 is a plan view of said machine.

Fig. 3 is a perspective view of the column cutout device.

Fig. 4 is a plan view of the column cutout device.

Fig. 5 is a cross section on the line 5—5 in Fig. 4.

Figure 6:
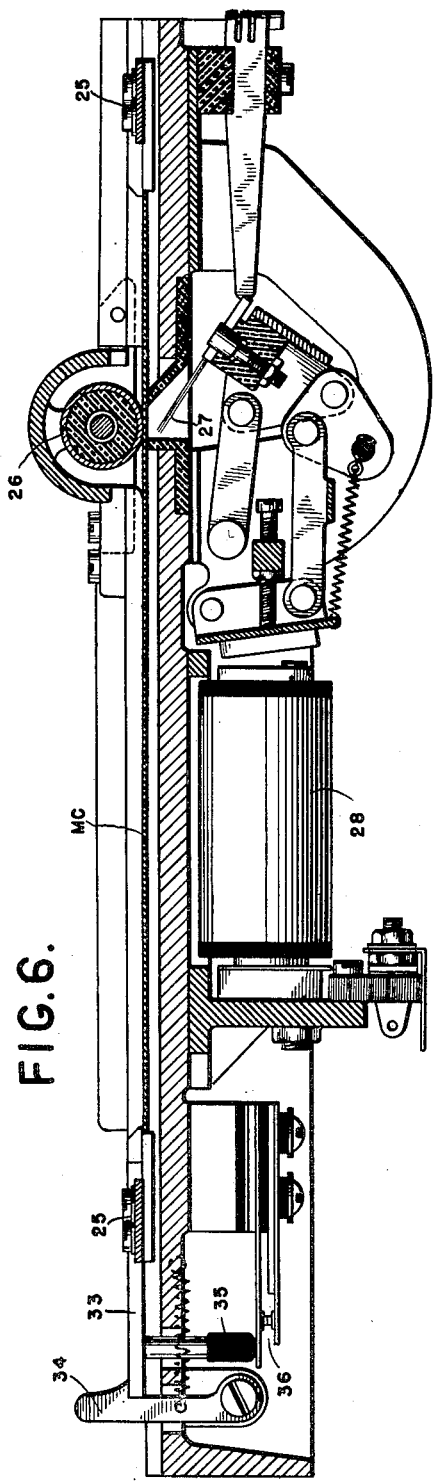
Fig. 6 is a vertical sectional view illustrating certain details of the master card reader.

The card punching machine illustrated in Figs. 1 and 2 is of the general type disclosed in Lee and Phillips Patent No. 1,772,186, issued August 5, 1930, and Lee and Daly Patent No. 1,976,618, issued October 9, 1934. The basic construction of this machine is well known, and hence only a brief description of the details will be given herein.

Referring to Figs. 1 and 2, a supply of blank record cards C is maintained in the hopper 10. These cards are removed successively from the hopper 10 by a picker 11 and are fed toward a punching station at which a row of aligned punches 12 is disposed. Each card, after it leaves the hopper 10, is disposed in a card carriage 13 which moves the card in step-by-step fashion to present the card columns successively to the row of punches 12.

The punches 12 are selected for operation by means of punch interposers 14 which are mounted for horizontal sliding movement above the heads of the punches 12. The interposers 14 are actuated by keys 15 in a manual keyboard or, alternatively, by duplicating magnets 16. The manner in which this is accomplished will be described in detail presently. Normally the interposers 14 are so disposed that notches 17 (Fig. 1) in the ends of these interposers are aligned with the punch actuating bar 18. When an interposer 14 is actuated, however, the notch 17 therein moves out of alignment with the actuating bar 18, and a full portion of the interposer 14 moves beneath the bar 18. Then, when the bar 18 is depressed, the active interposer 14 is pushed downwardly, causing the associated punch 12 to be driven through the card which is then in punching position. The inactive interposers 14 will not be affected by the movement of the bar 18.

When a numeral key 15 is depressed, it acts through the medium of a bell crank 20 (Fig. 1) to move the associated interposer 14 forwardly. When any of the interposers 14 moves ahead, it rocks a bail 21, and through the medium of a suitable linkage (not shown) this action is effective to close a pair of contacts 22 (Figs. 1 and 8) connected in series with the punch magnet 23. The punch magnet 23 is energized by the closure of the punch magnet contact 22 and attracts its armature 24. Through another linkage (not shown) the movement of the armature 24 is imparted to the punch actuating bar 18 to actuate the selected punch or punches 12. As an incident to this punching action, the punch magnet contact 22 is released and it thereupon opens, causing the punch magnet 23 to be deenergized.

When the machine is being used as a duplicating punch, the punch interposers 14 (Fig. 1) are actuated by duplicating magnets 16 under the control of a master card MC (Fig. 2) disposed on a master card carriage 25. The carriage 25 moves in unison with the card carriage 13 carrying the word card C. The carriage 25 advances the master card column by column past a contact roll 26 (Figs. 6 and 8) with which a series of conductive reading brushes 27 is adapted to cooperate. Normally the brushes 27 are disengaged from the contact roll 26, as shown in Fig. 6, but when the brush magnet 28 (Figs. 6 and 8) is energized, the brushes 27 are swung toward the roll 26. Those brushes which find perforations in the master card will engage the roll 26 and (assuming that the machine is being used for straight duplication) will establish electrical circuits for energizing the corresponding duplicating magnets 16. As a magnet 16 is energized, it attracts its armature 30, which is connected through the medium of a lever 31 to the shank of a key 15. Hence, the energization of a duplicating magnet 16 is effective to depress the corresponding key 15 and thereby actuate a punch interposer 14, causing perforations to be formed in the record card C under the control of the master card MC.

Associated with the master card table is a hinged plate or door 33 (Figs. 2 and 6) which normally is held down by a latch 34 to retain the master card MC on the master card table. A contact operating member 35 attached to the door 33 is adapted to engage a door contact 36 (Figs. 6 and 8) when the door 33 is held by the latch 34. The door contact 36 controls a circuit for energizing the brush magnet 28. When the door 33 is raised to permit removal or replacement of a master card, the contact 36 opens and breaks the circuit to the brush magnet 28, thereby releasing the master card brushes 27. The brushes 27 then drop into the positions thereof shown in Fig. 6, where they are protected from injury while the master card is being inserted or removed. As will appear hereinafter, the master card brushes 27 are likewise protected from injury under other circumstances by suitable safety provisions in the machine.

The drive for the machine is well known and will not be explained in detail herein. Referring to Fig. 1, motive power is provided by an electric motor 37, which is coupled to the card feeding mechanism through the medium of suitable clutch means controlled by a clutch magnet 38.

It has been mentioned that the illustrated machine may be used as a straight duplicating punch, a straight key punch, or as an editing key punch. When the machine is being used as a straight duplicating punch, the master card brushes 27 (Fig. 8) are respectively connected through the normally closed $a$ contacts of a control relay 40 to the respective duplicating magnets 16 that operate the punch interposers 14 (Fig. 1). Current is supplied to the master card contact roll 26 (Fig. 8) through a circuit including a conventional last-column contact 41, the previously described door contact 36, a column cutout contact 42 (hereinafter described), and a conventional floating cam contact 44. Another circuit is established through the contacts 41, 36 and 42 to the brush magnet 28 (Figs. 6 and 8) for energizing this brush magnet and moving the master card reading brushes 27 toward the contact roll 26. When any of the reading brushes 27 encounters a perforation in the master card, the circuit continues from the contact roll 26 through said brush 27 and the corresponding "$a$" contact of relay 40 to the appropriate duplicating magnet 16, which sets its punch interposer for perforating a corresponding hole in the record card that is positioned beneath the punches 12 (Fig. 2).

Figure 8:
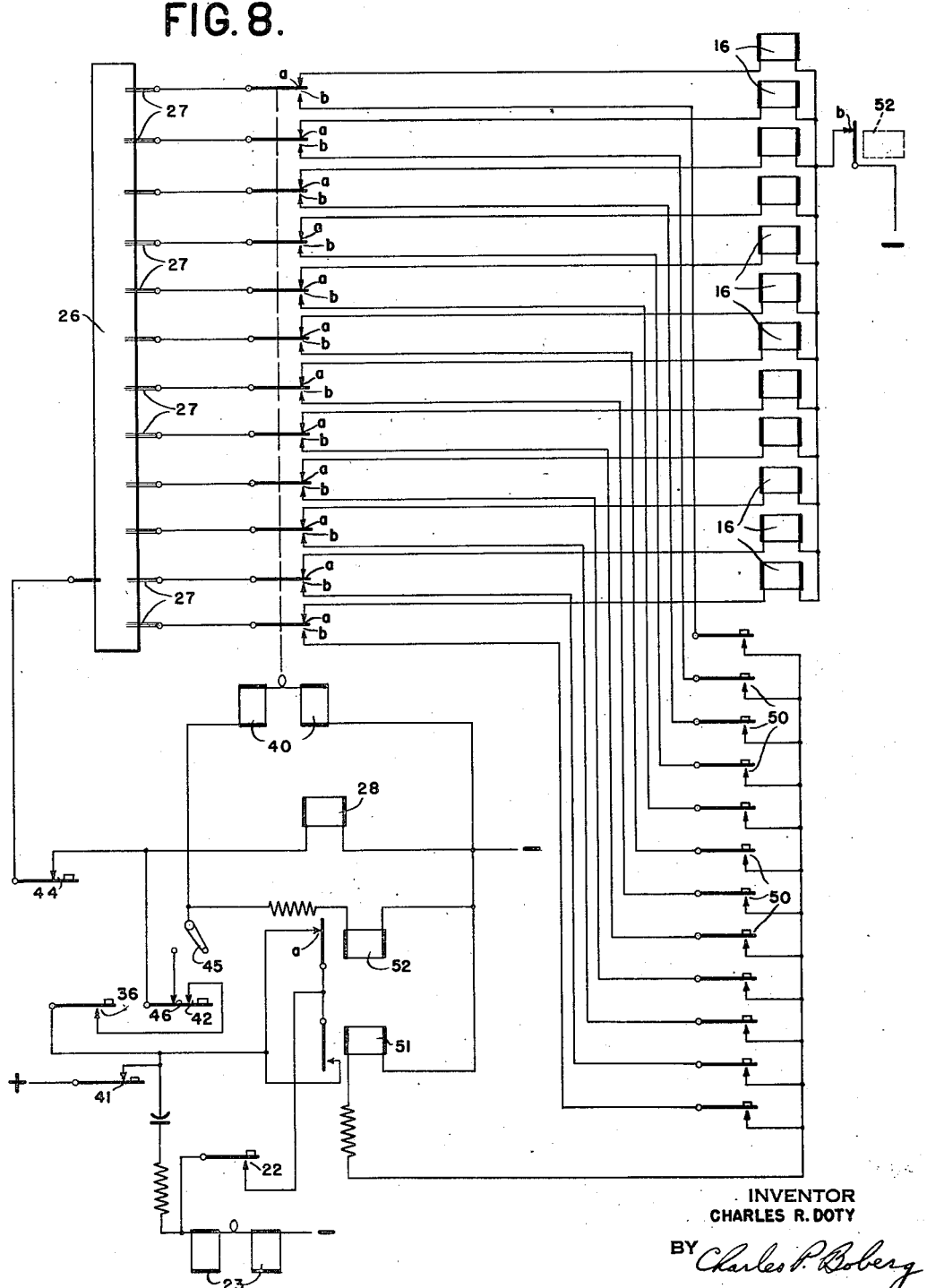
Fig. 8 is a circuit diagram of the illustrated machine.

The circuit diagram of the machine has been simplified somewhat in Fig. 8 so that the present invention can be more readily understood. Those parts of the general circuit which are not shown in Fig. 8 are familiar to those skilled in the art and have no direct relation to the invention.

Figure 7:
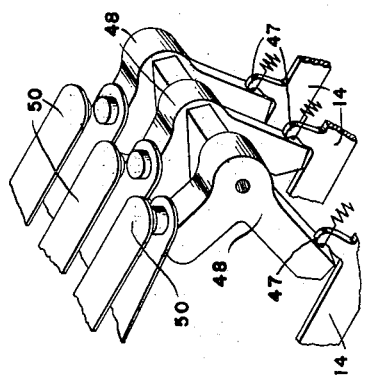
Fig. 7 is a partial perspective view of the interposer contact mechanism.

When the machine is to be used as an editing key punch, a switch 45 (Fig. 8) is thrown to its "on" position. A circuit thereby is established through the last-column contact 41, door contact 36, the cutout contact 42, another cutout contact 46, and a switch 45 to the winding of the control relay 40. As relay 40 energizes, it opens its "$a$" contacts (thereby interrupting the duplicating circuits) and closes its "$b$" contacts. Referring to Figs. 1 and 7 in connection with Fig. 8, it will be seen that each of the punch interposers 14 has a lug 47 thereon that is cooperable with one of a series of contact-operating levers 48 for individually operating a series of interposer contacts 50. Whenever a punch interposer 14 is shifted into its active position, it closes the corresponding interposer contact 50. As shown in Fig. 8, the interposer contacts 50 and the "$b$" contacts of relay 40 are included in a plurality of checking or editing circuits for controlling the operation of the punch magnet 23.

Assume, for example, that it is desired to key punch only those cards in which the numeral 1 or 2 appears in a particular card column. Under these circumstances the master card is perforated at the "1" and "2" index positions in the corresponding column thereof. When this column reaches the master card reading brushes 27, the brushes 27 corresponding to the digits 1 and 2 will engage the contact roll 26, and the remaining brushes will be held out of contact with the roll 26 by the blank portion of the master card. Then, if the operator depresses a "1" or "2" key 15 (Figs. 1 and 2), a circuit will be completed from a master card brush 27 (Fig. 8) through a "$b$" contact of relay 40 and the interposer contact 50 actuated by said key to a relay 51 (Fig. 8). Inasmuch as the punch magnet contact 22 (Figs. 1 and 8) is closed due to the forward movement of the selected punch interposer, in the manner previously described, a circuit now is closed through the last-column contact 41, contact of relay 51 and punch magnet contact 22 to the punch magnet 23. As magnet 23 energizes, it causes the selected punch to be driven through the card.

If the operator does not select a key 15 which corresponds to the punching of the master card, it will not be possible to complete a circuit through the interposer contacts 50 for operating the punch magnet 23. Thus, for example, if the operator depresses the "5" key while the master card is punched for digits 1 and 2 only, the closure of the "5" interposer contact 50 will be without effect, inasmuch as the "5" card reading brush 27 is held out of contact with the roll 26. Therefore, no punching action takes place, and the operator is compelled to repeat the operation with the correct key or investigate the cause of the non-check condition. In this way, the master card is utilized to supervise or edit the key punching operations.

When the switch 45 (Fig. 8) is thrown "on" to condition the machine for edited key punching, a relay 52 becomes energized and opens its normally closed "a" and "b" contacts. Contact 52a normally maintains a connection between the last-column contact 41 and the punch magnet contact 22, while the contact 52b provides a return for the energizing circuits of the duplicating magnets 16. When edited key punching is in progress, it is desired that both of these connections be broken, and the relay 52 performs this function so that the relay 51 will be in control of the punch magnet 23.

For straight key punching independently of the master card, both of the column cutout contacts 42 and 46 (Fig. 8) are held open by means of a column cutout device illustrated in Figs. 3, 4 and 5. A thumb lever 55 is pivoted at 56 (Fig. 2) on a small frame 57 that connects the card carriages 13 and 25. When straight key punching is to be performed, the operator swings the thumb lever 55 counterclockwise as viewed in Fig. 2, causing it to actuate a member 58, pivoted at 56, against the action of a spring 59. The member 58 bears against a bail 60 having an arm 61 (Figs. 3, 4 and 5) that bears against an insulated portion of a spring contact member 62 common to the cutout contacts 42 and 46. Manual actuation of the thumb lever 55 is sufficient to open both of the cutout contacts 42 and 46. Referring to Fig. 8, this causes both the brush magnet 28 and the relay 52 to be deenergized. Hence, reading of the master card cannot take place, and the punch magnet 23 will operate each time the punch magnet contact 22 closes, that is to say, each time a punch interposer is actuated by depressing a key 15.

For straight duplication, it is desired that only one of the cutout contacts, namely, the contact 46, be opened. The other cutout contact 42 must remain closed for supplying current to the master card contact roll 26. It is determined in advance which of the master card columns are to be duplicated, and an automatic cutout bar 64 (Figs. 2, 3, 4 and 5), shaped in accordance with the master card fields which are to be duplicated, is employed. The cutout bar 64 is fastened to the bed of the machine in such a position that a roller 65 on the pivoted member 58 rides along the shaped edge of the bar 64. When the roller 65 is riding on a recessed portion of the bar 64, as shown in Figs. 3 and 4, both of the cutout contacts 42 and 46 are closed. If the keys 15 are operated under these conditions, edited key punching will take place. When the roller 65 rides onto a high portion of the cutout bar 64, the contact 46 opens and the contact 42 remains closed. This enables the machine to act as a duplicating punch. If ordinary key punching without editing is desired, as explained above, the thumb lever 55 is operated to open both of the contacts 42 and 46.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a card punching machine adapted to utilize a master card and having a plurality of punch elements for selectively perforating the index points of a record card to represent data therein, the combination of master card reading means including a plurality of sensing elements respectively cooperable with the index points of the master card for sensing data designations recorded therein, a plurality of punch interposers associated respectively with the punch elements and respectively corresponding to the various index points of the record card, keys for setting said punch interposers selectively to condition the punch elements for perforating the record card, a punch action including an electromagnet operable to actuate those punch elements that have been conditioned by the setting of said interposers, punch action supervising means including a plurality of editing circuits controlled jointly by said sensing elements and said interposers to permit the operation of said electromagnet only when a punch interposer is set for producing a perforation at an index point corresponding to an index point at which a data designation is sensed by a sensing element, cutout means for optionally cutting out said punch action supervising means to permit the operation of said electromagnet each time one of said interposers is actuated, and alternative control means including devices for actuating said punch interposers individually under the sole control of said master card sensing elements to duplicate information from the master card into the record card, said alternative control means being governed by said cutout means to take effect when said punch action supervising means is cut out.

2. In a card punching machine adapted to utilize a master card and having a plurality of punch elements for selectively perforating the respective index points of a record card to represent data therein, the combination of master card sensing elements including a plurality of electrical contacts respectively cooperable with the index points of the master card, said contacts being adapted to operate in accordance with the data designations recorded in the master card, a plurality of keys associated respectively with the punch elements and respectively corresponding to the various index points of the record card, a plurality of punch interposers controlled respectively by said keys for conditioning the punch elements to operate according to the manner in which said interposers are set, a punch action including an electrical device operable to actuate those punch elements that have been conditioned by the setting of said interposers, punch-controlling contacts respectively operated by said interposers, punch action supervising circuits controlled jointly by said sensing element contacts and said punch-controlling contacts to permit the operation of said electrical device only upon the concurrent closure of a punch-controlling contact and a sensing element contact corresponding to like index points on the record card and the master card, respectively, a plurality of electromagnets respectively associated with said interposers and operable to actuate said interposers independently of said keys, and cutout means having a normal position wherein said supervising circuits are effective and two alternative cutout positions wherein said supervising circuits are rendered ineffective, said cutout means being effective when in the first cutout position to place said electromagnets under the control of said master card sensing elements for duplicating in the record card information read from the master card, and being effective when in the second cutout position for enabling said interposers to be operated only by said keys.

3. In a duplicating card punch having a card carriage adapted to advance a record card column by column through a punching station, the combination with said carriage of a stationary cutout bar extending parallel to the path of said carriage, a cutout member pivotally mounted on said carriage having a portion engaged with said cutout bar and having another portion adapted to be gripped manually for pivoting said member relative to said carriage, said cutout member being settable selectively to a plurality of positions, a pivoted bail cooperating with said cutout member, a pair of electrical contacts controlled by said bail and so arranged that both of said contacts are closed when said cutout member is in a first one of its positions, both of said contacts being opened when said cutout member is in a second one of its positions, while one of said contacts is closed and the other of said contacts is open when said cutout member is in a third one of its positions, said cutout bar being adapted to place said cutout member alternatively in its first and third positions as said carriage traverses said bar, with said cutout member being movable manually into its second position, a keyboard, means for reading a master card, means for punching the record card at said punching station, electrical means controlled by said electrical contacts and effective when said cutout member is in its first position for causing said punching means to operate under the joint control of said master card reading means and said keyboard, and other electrical means controlled by said electrical contacts and effective when said cutout member is in its third position for causing said punching means to operate automatically under the sole control of said master card reading means, with said punching means being under the sole control of said keyboard when said cutout member is in its second position.

CHARLES R. DOTY.

References Cited in the file of this patent

UNITED STATES PATENTS

| Number | Name | Date |
|---|---|---|
| 1,772,186 | Lee et al. | Aug. 5, 1930 |
| 1,976,618 | Lee et al. | Oct. 9, 1934 |
| 2,080,192 | Youngberg | May 11, 1937 |
| 2,164,698 | Buckley | July 4, 1939 |